United States Patent [19]

Kato

[11] Patent Number: 4,466,030
[45] Date of Patent: Aug. 14, 1984

[54] CASSETTE LOADING/UNLOADING APPARATUS FOR CASSETTE TAPE RECORDER

[75] Inventor: Toshikazu Kato, Tokyo, Japan

[73] Assignee: Olympus Optical Co., Ltd., Tokyo, Japan

[21] Appl. No.: 348,329

[22] Filed: Feb. 12, 1982

[30] Foreign Application Priority Data

Feb. 24, 1981 [JP] Japan .................. 56-24927[U]

[51] Int. Cl.³ .................. G11B 5/008; G11B 15/00; G11B 15/32; G03B 1/04
[52] U.S. Cl. .................. 360/96.5; 242/198; 360/137
[58] Field of Search .................. 360/96.5, 137, 96.1, 360/96.6, 105, 93; 242/200, 199, 198, 206, 192

[56] References Cited

U.S. PATENT DOCUMENTS

| 3,638,953 | 2/1972 | Kadama et al. | 360/96.5 |
| 3,758,119 | 9/1973 | Harlan | 360/96.5 |
| 3,781,017 | 12/1973 | Baldwin | 242/198 |
| 3,976,262 | 8/1976 | Kennedy | 242/192 |
| 4,163,997 | 8/1979 | Sugihara | 360/137 |
| 4,377,829 | 3/1983 | Kamimura | 242/199 |
| 4,379,314 | 4/1983 | Kamimura | 360/96.5 |
| 4,402,024 | 8/1983 | Kato | 360/96.5 |

FOREIGN PATENT DOCUMENTS 146651 11/1980 Japan .

Primary Examiner—Robert Martin Kilgore
Attorney, Agent, or Firm—Frishauf, Holtz, Goodman & Woodward

[57] ABSTRACT

A cassette loading/unloading apparatus for a slot-in type cassette tape recorder is provided with a toggle spring and an ejecting spring. The toggle spring biases a slider which slides together with a cassette inside a cassette holder at cassette insertion. The ejecting spring is stretched between the cassette holder and an operating plate slidably attached to the cassette holder, functioning as a return spring for the operating plate. The ejecting spring is charged with a biasing force in concert with and only by the slide of the slider at the cassette insertion, and is disengaged from the slider to be locked to a charged state when the slider passes the neutral point of the toggle spring. The charged biasing force of the ejecting spring is caused to act as an ejecting force on the slider at cassette ejection.

5 Claims, 12 Drawing Figures

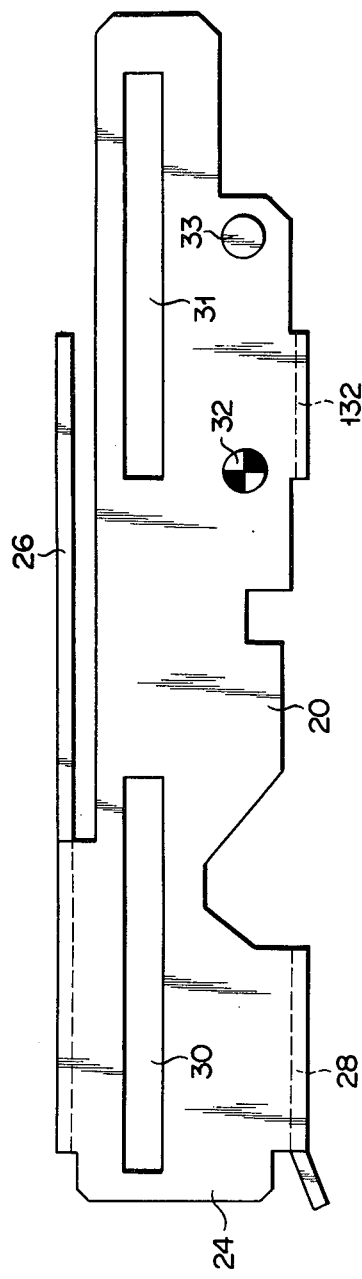
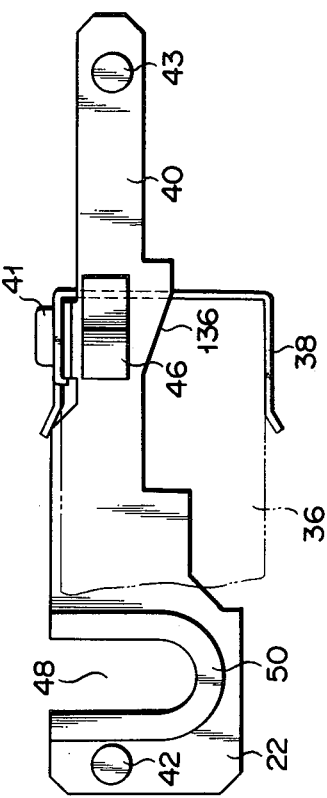

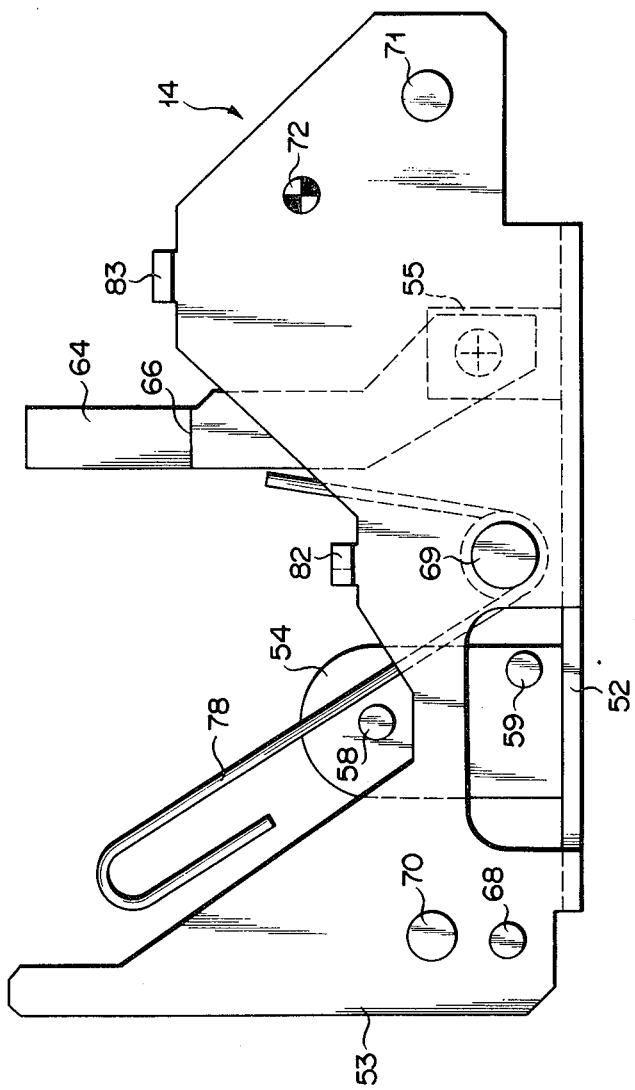

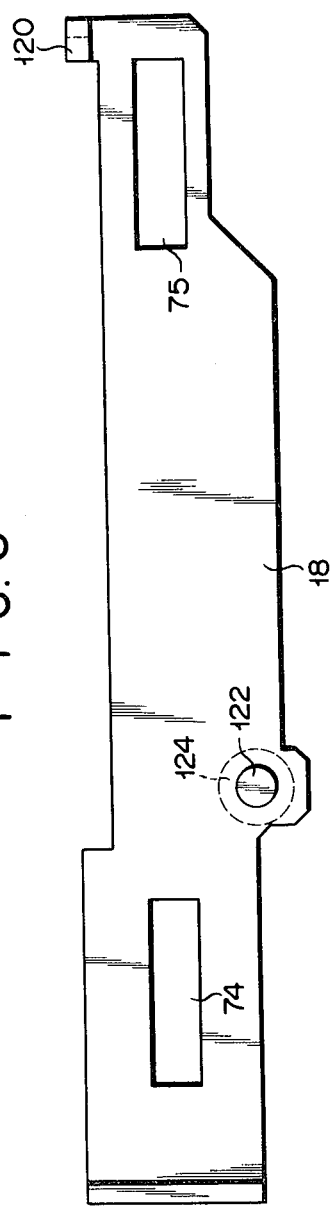
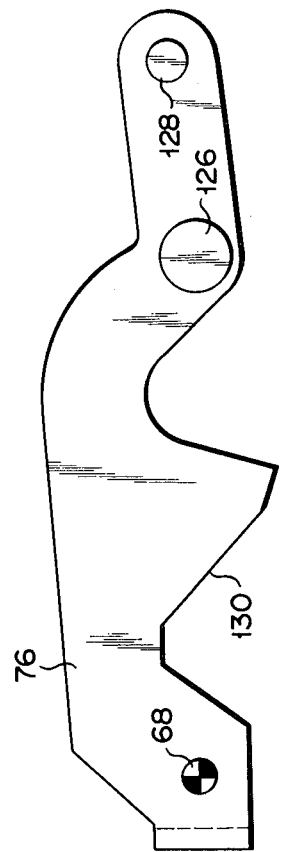

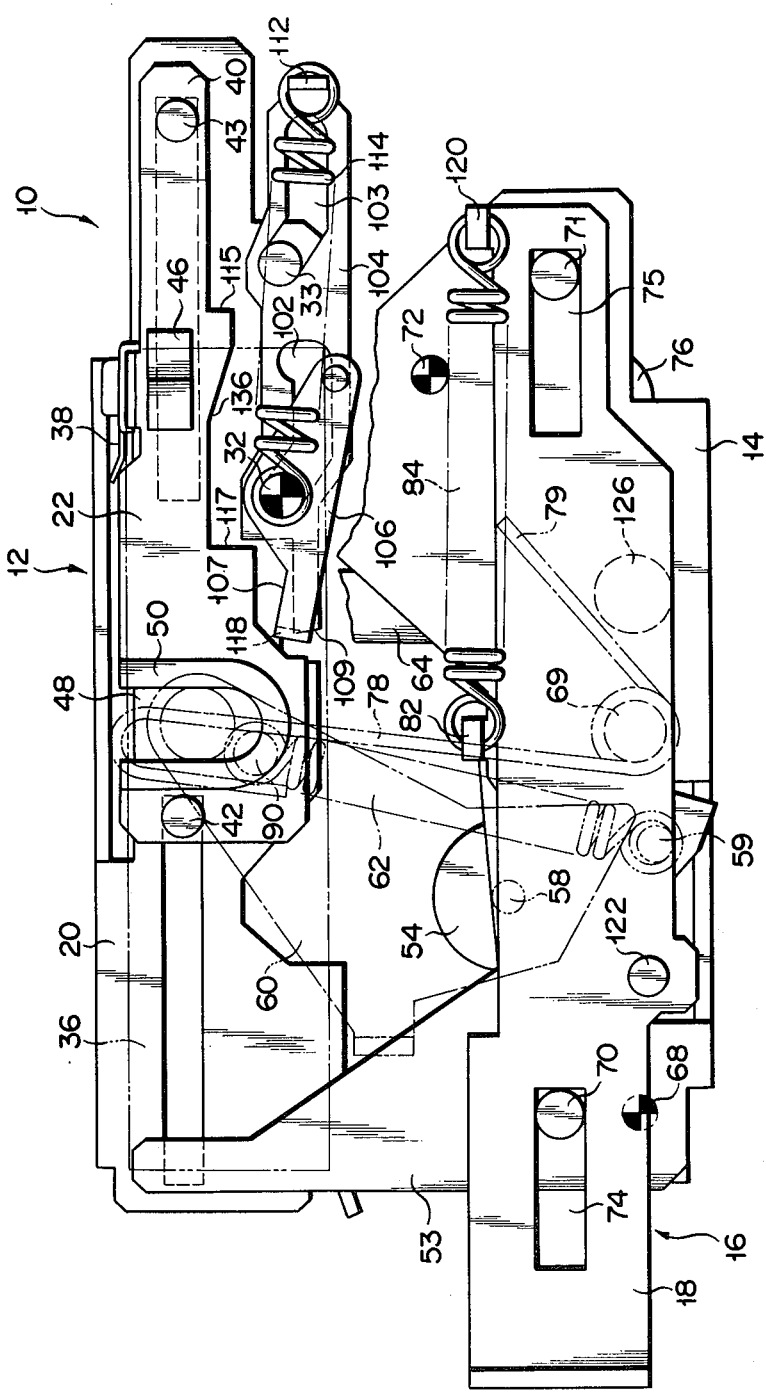

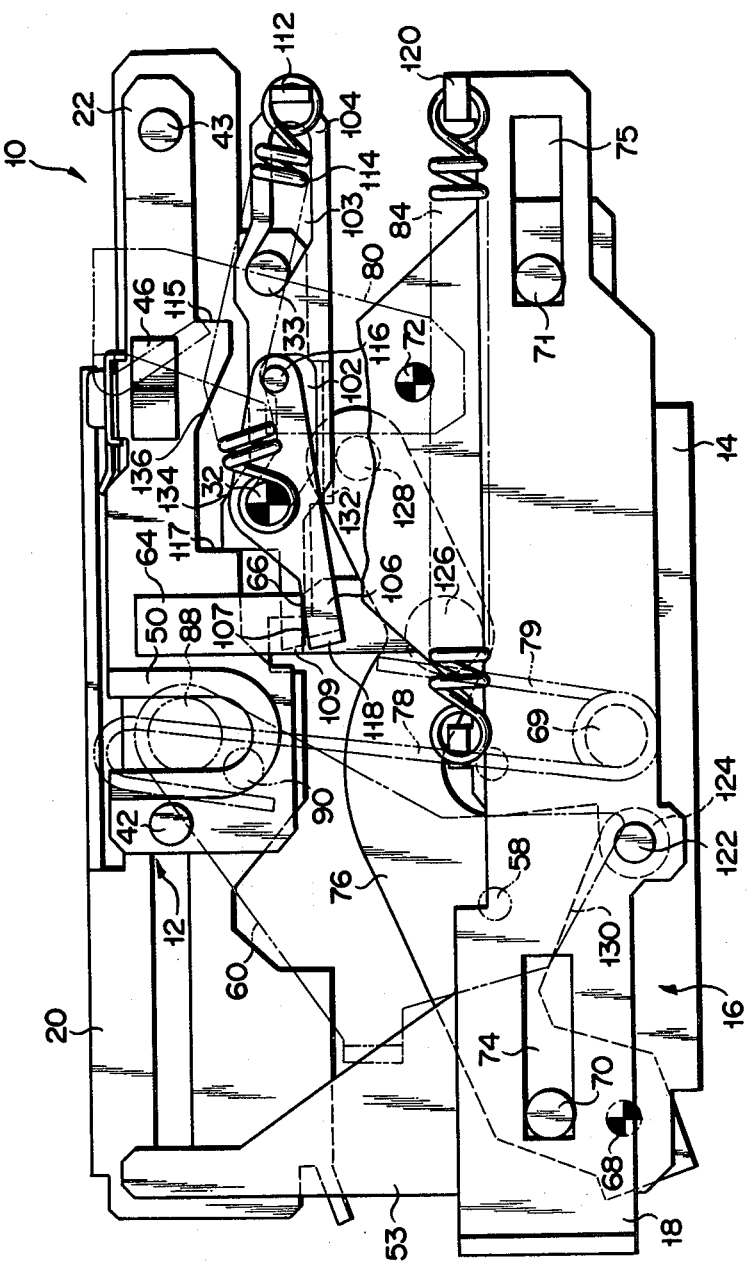

CASSETTE LOADING/UNLOADING APPARATUS FOR CASSETTE TAPE RECORDER

BACKGROUND OF THE INVENTION

This invention relates to a cassette loading/unloading apparatus for cassette tape recorder.

In a slot-in type cassette tape recorder utilizing a toggle spring, a cassette is pushed into a cassette holder against the biasing force of the toggle spring at cassette insertion until it reaches the neutral point of the toggle spring. When the neutral point of the toggle spring is passed, the biasing force of the toggle spring acts so as to draw the cassette in the cassette holder, and thus the cassette is instant drawn into the cassette holder. The stroke of the cassette terminating at the neutral point of the toggle spring is called pushing-in stroke, while the stroke starting at the neutral point is called drawing-in stroke. The length of each stroke is proportional to the biasing force produced in the toggle spring. If the drawing-in stroke is large, the biasing force of the toggle spring to act after the cassette is drawn in the cassette holder may be set at a high level, so that the cassette can be loaded securely. If the pushing-in stroke is large, on the other hand, the biasing force of the toggle spring to act as an ejecting force at cassette ejection may be set at a high level, so that the cassette ejection can be ensured.

The biasing force of the toggle spring which acts in the drawing-in stroke, however, acts as a resisting force against the action of an ejecting plate at the cassette ejection. If the drawing-in stroke is large, therefore, the action of the ejecting plate will be unsmooth, so that the ejecting plate will have to be operated with a greater pushing force at the cassette ejection.

Staar and counter-Staar type cassette tape recorders are known as slot-in type cassette tape recorders.

SUMMARY OF THE INVENTION

It is therefore an object of this invention to provide a cassette loading/unloading apparatus for cassette tape recorder capable of cassette ejection with a small pushing force despite the use of a large drawing-in stroke.

To this end, according to the invention, an ejecting spring is previously charged with a biasing force in concert with the slide of a slider at cassette insertion, and the charged biasing force of the ejecting spring is applied as an ejecting force to the slider at cassette ejection.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

BRIEF DESCRIPTION OF THE DRAWING

FIGS. 1 and 10 to 12 are schematic right side views of a cassette tape recorder provided with a cassette loading/unloading apparatus according to this invention, partially represented by one-dot chain lines for simplicity of drawing, in which:

FIG. 1 shows a state before the insertion of a cassette;

FIG. 10 shows a state after the cassette insertion and before the descent of a cassette holder;

FIG. 11 shows a state after the descent of the cassette holder; and

FIG. 12 shows a state after the ascent of the cassette and before the cassette ejection.

FIGS. 2 to 9 are right side views of principal parts of the cassette tape recorder, in which:

FIG. 2 shows the cassette holder;
FIG. 3 shows a slider;
FIG. 4 shows a baseplate;
FIG. 5 shows a rocking plate;
FIG. 6 shows an operating plate;
FIG. 7 shows a stopper plate;
FIG. 8 shows an ejecting plate; and
FIG. 9 shows a kick plate.

DETAILED DESCRIPTION OF THE PREFERRED EMBODIMENT

Figure 1:
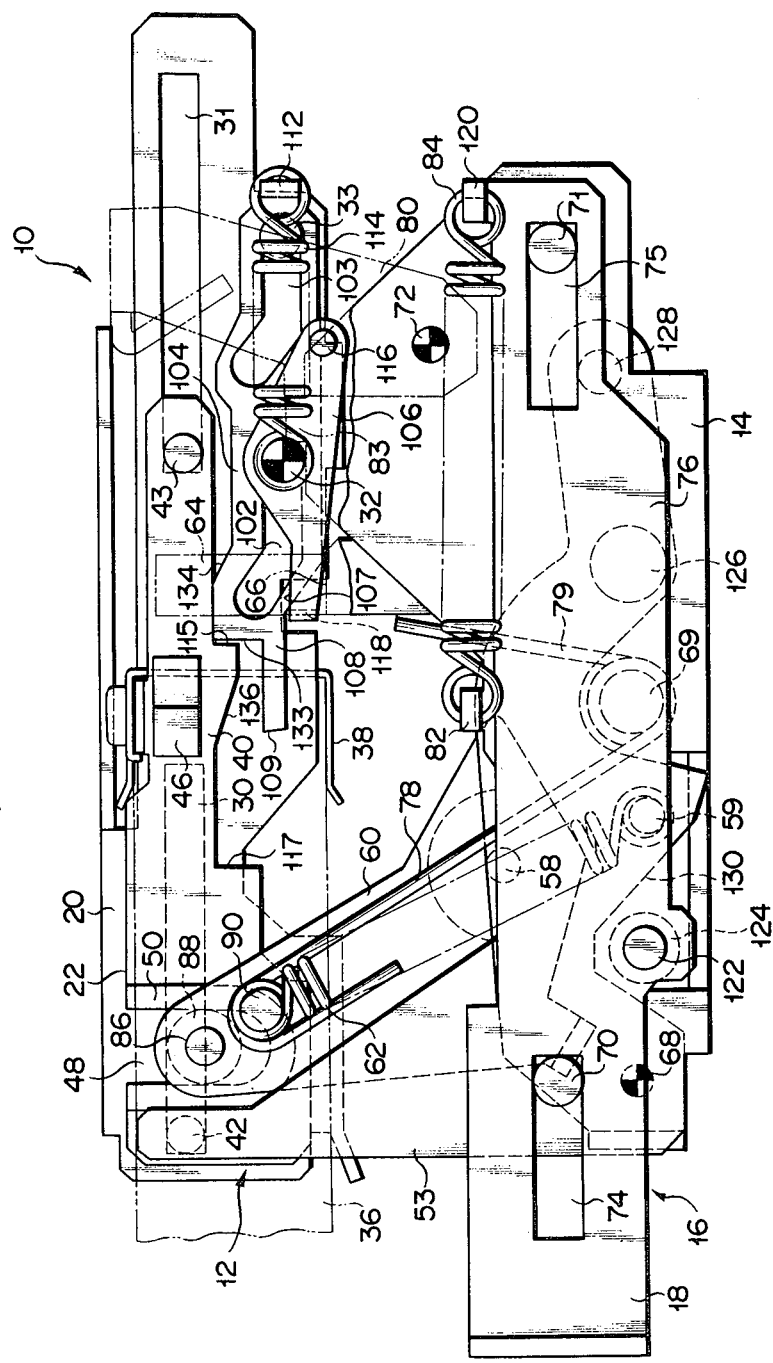

As shown in FIG. 1, a cassette tape recorder 10 is provided with a slot-in type cassette loading/unloading apparatus 12 utilizing a toggle spring. A baseplate 14 is fixed on a chassis (not shown), and a cassette ejecting mechanism 16 is disposed on the baseplate 14. Capable of moving up and down, the cassette loading/unloading apparatus 12 is normally located in an upper position, and is moved to a lower position to establish an operation mode such as a reproduction mode when a cassette is inserted thereinto. When an ejecting plate 18 of the ejecting mechanism 16 is pressed, the cassette loading/unloading apparatus 12 is moved from the lower position to the upper position, and the cassette is then ejected.

As seen from FIG. 1, the cassette loading/unloading apparatus 12 includes a cassette holder 20 capable of ascent and descent and in which the cassette is inserted and set, and a slider 22 which slides in the cassette holder 20, holding the cassette inserted in the cassette holder 20. As shown in FIG. 2, the cassette holder 20 includes a pair of side plates (only right side plate 24 shown in FIG. 2) and a top plate 26 connecting the side plates, and a guide strip 28 extends horizontally inward from the lower edge of each side plate. A pair of horizontal guide slots 30 and 31 are formed in the right side plate 24 to serve as guide grooves for the slider 22. Further, a pair of pins 32 and 33 are erected on the right side plate 24 to extend outward therefrom. The slider 22 is so disposed as to hold the right side plate 24. As seen from FIG. 3, moreover, the slider 22 includes a U-shaped supporting strip 38 located inside the right side plate 24 to hold a cassette 36 inserted in the cassette holder 20. The supporting strip 38 is formed of an elastic plate. The slider 22 further includes a movable block 40 outside the right side plate 24, and the supporting strip 38 is fixed to the movable block 40 by a screw 41. A pair of pins 42 and 43 are erected on the movable block 40 to extend inward therefrom, and the slider 22 is allowed to slide relatively to the cassette holder 20 with the pins 42 and 43 fitted in the slots 30 and 31, respectively, of the cassette holder 20 (see FIG. 1). Attached to the outer face of the movable block 40 are a flat, wedge-shaped cam strip 46 and a plastic guide strip 50 with a vertically elongated guide slot 48 formed therein.

As shown in FIG. 4, the baseplate 14 fixed on the chassis includes a horizontal plate 52 located on the chassis, a bent plate 53 extending upward from the right side edge of the horizontal plate 52, and a pair of bent plates 54 and 55 extending upward from the left side edge of the horizontal plate 52. A pair of pins 58 and 59 are erected on the bent plate 54 to extend outward therefrom. The pin 58 serves as the rocking center of a rocking plate 60 mentioned later, while the pin 59 functions as a supporting pin for a tension coil spring 62 mentioned later (see FIG. 1). A release plate 64 is screwed to the bent plate 55. Formed of an elastic member such as a spring, the release plate 64 is bent twice at right angles at a shoulder portion 66 in the middle so as to have its free end portion located inside its basal portion. The release plate 64 is so designed as to be pressed by the cam strip 46 to be curved outward as the slider 22 slides. Five pins 68, 69, 70, 71 and 72 are erected on the bent plate 53, the pins 68 and 69 extending inward and the pins 70, 71 and 72 outward. The outwardly extending pins 70 and 71 are fitted in their corresponding horizontal slots 74 and 75 of the ejecting plate 18 to guide the ejecting plate 18 in slide (see FIG. 1). On the other hand, a kick plate 76 (see FIG. 1) of the ejecting mechanism 16 is rockably mounted on the bent plate 53 by the inwardly extending pin 68, and a torsion coil spring 78 is wound around the other inwardly extending pin 69. A holder supporting plate 80 (see FIG. 1) is rockably mounted in the form of an overbridge by the pin 72 and its counterpart (not shown) on the left side, supporting the cassette holder 20 in the upper position. Stopper strips 82 and 83 protrude outward from the upper edge of the bent plate 53. The stopper strip 82 serves as a stopper for a tension coil spring 84 as a return spring for the ejecting plate 18, while the stopper strip 83 functions as a stopper for regulating the rocking position of the holder supporting plate 80.

Figure 5:
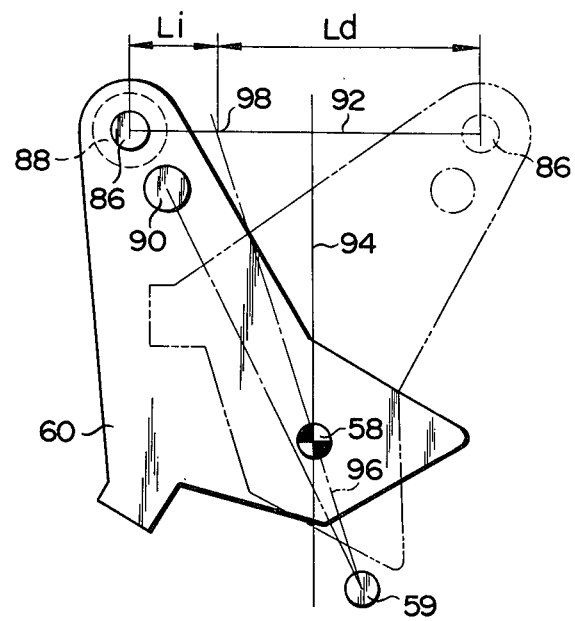

As shown in FIGS. 1 and 5, the rocking plate 60 rockably mounted on the baseplate 14 by the pin 58 has an inwardly extending pin 86 erected on its upper end portion, and a plastic ring 88 is fitted on the pin 86. The ring 88 is of such a size that it can move up and down inside the guide slot 48 of the movable block 40. Adjoining the pin 86, moreover, a pin 90 is erected on and protrudes from the rocking plate 60, and the tension coil spring 62 is disposed between the pin 90 and the pin 59 on the baseplate 14. The tension coil spring 62 functions as a toggle spring.

When the cassette 36 is inserted into the cassette holder 20, it is held by the supporting strip 38 of the slider 22 and slides together with the slider 22 inside the cassette holder 20, moving inward or to the right of FIG. 1 as the cassette 36 is inserted. The rocking plate 60, which is coupled with the movable block 40 of the slider 22 by the pin 86 and the ring 88, rocks in the clockwise direction around the pin 58 as the rocking center, accompanying the slide of the slider 22. In FIG. 5, a one-dot chain line represents the position of the rocking plate 60 at a point of time when the slider 22 has reached its innermost position to complete the cassette insertion. As seen from FIG. 5, the pin 58 as the rocking center lies on the perpendicular bisector 94 of a segment 92 connecting the positions of the pin 86 before and after its rocking. The supporting pins 59 and 90 for the toggle spring or tension spring 62, however, are not located on the perpendicular bisector 94. Namely, the pins 59 and 90 are located on the right and left sides, respectively, of the perpendicular bisector 94. Further, the neutral point 98 of the toggle spring 62, i.e., the intersection of the segment 92 and the extension of a segment 96 connecting the pins 58 and 59, is located on the left side of the perpendicular bisector 94. In FIG. 5, Li and Ld indicate the pushing-in and drawing-in strokes, respectively, the drawing-in stroke Ld being larger than the pushing-in stroke Li. The biasing force of the toggle spring 62 in the drawing-in stroke Ld can be made substantial large enough by thus deliberately setting the fitting position of the toggle spring 62 to make the drawing-in stroke Ld large enough. Accordingly, there may be provided a cassette loading/unloading apparatus with improved resistance to vibration and capable of secure cassette loading even with use of a micro cassette.

If the biasing force of the toggle spring 62 in the drawing-in stroke Ld is great, however, it will act as a resisting force at cassette ejection, so that the pushing force necessary for the ejecting plate 18 will have to be increased. According to this invention, therefore, a tension spring 114 is previously charged with a biasing force at cassette insertion, and the charged biasing force is caused to act as a cassette ejecting force, thereby reducing the necessary pushing force for the ejecting plate 18 in the cassette ejecting stroke, as mentioned later.

As seen from FIG. 1, an operating plate 104 is slidably attached to the cassette holder 20 with the pins 32 and 33 of the cassette holder 20 fitted in slots 102 and 103, respectively. A stopper plate 106 is rockably mounted on the cassette holder 20 by the pin 32.

Figure 6:
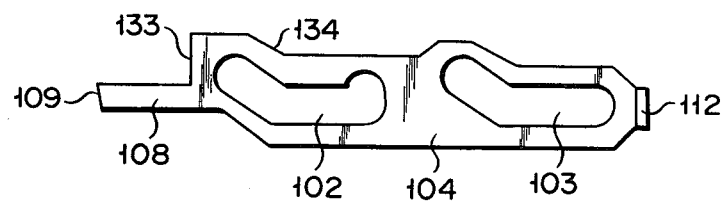

As shown in FIG. 6, the slots 102 and 103 of the operating plate 104 have a slanting portion and a horizontal portion, respectively. These slots 102 and 103 differ in that the slot 102 has a vertical portion at the right end. The operating plate 104 has an extended portion 108 at the left end, the tip end of the extended portion 108 forming a slanting surface 109. An outwardly bent stopper strip 112 is formed at the right end of the operating plate 104, and a tension coil spring 114 as a return spring for the operating plate 104 is disposed between the stopper strip 112 and the pin 32 (see FIG. 1). The operating plate 104 is biased to the left of FIG. 1 by the biasing force of the tension spring 114, so that the pins 32 and 33 are pressed by the right ends of the slots 102 and 103, respectively.

Figure 7:
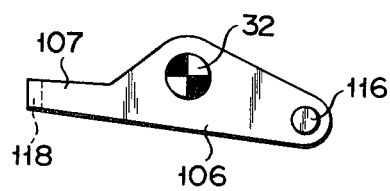

As shown in FIG. 7, the stopper plate 106 has a pin 116 extending outward from the right end portion and a stopper strip 118 bent inward from the left end of the plate 106. As shown in FIG. 1, the stopper plate 106 is urged to rock clockwise around the pin 32 with the pin 116 in contact with the tension spring 114, and is restrained from rocking with its upper left edge 107 pressed against the shoulder portion 66 of the release plate 64. As the stopper strip 118 engages the slanting surface 109 of the operating plate 104 at the cassette insertion as mentioned later, the tension coil spring 114 is previously charged with a necessary force for the cassette ejection and maintained as it is.

The cassette ejecting mechanism 16 includes the ejecting plate 18 slidably attached to the baseplate 14 by combinations of the pins 70 and 71 and the slots 74 and 75, and the kick plate 76 rockably attached to the baseplate 14 by the pin 68. As shown in FIGS. 1 and 8, the ejecting plate 18 has a stopper strip 120 bent outward from the right end portion and a pin 122 protruding inward from the middle portion. A tension coil spring 84 is disposed between the stopper strip 120 and the stopper strip 83 of the baseplate 14 to bias the ejecting plate 18 to the left of FIG. 1. Thus, the pins 70 and 71 of the baseplate 14 is normally pressed against the right ends of the slots 74 and 75, respectively, of the ejecting plate 18. A ring 124 is rockably mounted on the pin 122. As seen from FIGS. 1 and 9, on the other hand, the kick plate 76 has a pair of inwardly projected pins 126 and 128 and a cam surface 130.

At the cassette ejection, the ejecting plate 18 slides to the right of FIG. 1, pressed against the biasing force of the tension spring 84. When the ejecting plate 18 slides to the right, the ring 124 of the ejecting plate 18 abuts against the cam surface 130 of the kick plate 76. Thereafter, when the ejecting plate 18 is further pressed, the ring 124 rolls along the cam surface 130, and the kick plate 76 is rocked counterclockwise around the pin 68, accompanying the rightward slide of the ejecting plate 18. As the kick plate 76 rocks, the pins 126 and 128 are pressed against one end portion 79 of the torsion spring 78 and a lower-edge bent strip 132 (see FIG. 2) of the cassette holder 20, respectively. The cassette ejection will be described in detail later.

The tape recorder 10 of the above-mentioned construction is operated as follows.

Referring to FIG. 1, when the cassette 36 is inserted into the cassette holder 20, it is first held by the supporting strip 38 of the slider 22. Then, when the cassette 36 is further pushed in, the pins 42 and 43 of the slider 22 move to the right, guided by the slots 30 and 31 of the cassette holder 20. Accordingly, the cassette 36 is slid together with the slider 22 to the right inside the cassette holder 20. When the slider 22 moves to the right, the rocking plate 60, with its ring 88 engaged with the guide strip 50, rocks in the clockwise direction around the pin 58 against the biasing force of the toggle spring or tension spring 62. Further, a shoulder portion 115 of the movable block 40 of the slider 22 abuts against the left end 133 of the operating plate 104 to press the same, so that the operating plate 104 is moved together with the slider 22 to the right against the biasing force of the tension spring 114. Thus, the cassette 36 is inserted while receiving the biasing forces of the tension springs 62 and 114 as resisting forces, and the tension spring 114 is charged with biasing force. When the rocking plate 60 passes the neutral point 98 (see FIG. 5), the biasing force of the tension spring 62 as the toggle spring functions not as the resisting force but as a drawing-in force to rock the rocking plate 60 in the clockwise direction. When the slider 22 slides to the right, moreover, the release plate 64 is curved outward by the cam strip 46, so that the stopper plate 106 is disengaged from the shoulder portion 66. In the pushing-in stroke Li terminating at the neutral point 98 of the toggle spring 62, the horizontal portions of the slots 102 and 103 of the operating plate 104 serve as guide slots for the pins 32 and 33 of the cassette holder 20, and the operating plate 104 moves horizontally. When the rocking plate 60 passes the neutral point 98, however, the slanting portions of the slots 102 and 103 guide the pins 32 and 33, respectively, so that the operating plate 104 descends and moves to the right. As the operating plate 104 moves down, the left end 133 of the operating plate 104 is disengaged from the shoulder portion 115 of the movable block 40, and the extended portion 108 of the operating plate 104 moves to the inside of the stopper plate 106. Then, the slanting surface 109 of the operating plate 104 is pressed against the stopper strip 118 of the stopper plate 106 by the biasing force of the tension spring 114. After the shoulder portion 115 is disengaged from the left end 133 of the operating plate 104, the biasing force of the tension spring 114 does not act on the slider 22 at all. Namely, the biasing force of the tension spring 114, which acts as a resisting force against the slide of the slider 22 in the pushing-in stroke Li, never acts on the slider 22 in the drawing-in stroke Ld. The biasing force of the tension spring 114 charged in the pushing-in stroke Li is maintained as it is. In the drawing-in stroke Ld, the biasing force of the tension spring 62 acts as a drawing-in force for the slider 22 and the cassette 36. FIG. 10 shows a state in which the cassette 36 is completely set in the cassette holder 20 after the end of the drawing-in stroke Ld.

As seen from FIGS. 1 and 10, the one end portion 79 of the torsion spring 78 is not in contact with the pin 126 of the kick plate 76 in the cassette insertion. Therefore, the cassette insertion is not disturbed by the torsion spring 78.

At the end of the drawing-in stroke Ld, the cassette 36 abuts against the holer supporting plate 80 to rock the same in the clockwise direction of FIG. 1 around the pin 72 against the biasing force of a torsion spring (not shown). When the holder supporting plate 80 rocks in the clockwise direction, the cassette holder 20 is released from the support by the holder supporting plate 80, and is lowered from an upper position shown in FIG. 10 to a lower position shown in FIG. 11. The lower position of FIG. 11 is an operation position, and a desired mode, such as the reproduction mode, is set as required by pressing a button, such as e.g. a play button (not shown), by the conventional method to move the head lever and pinch roller lever.

Figure 11:
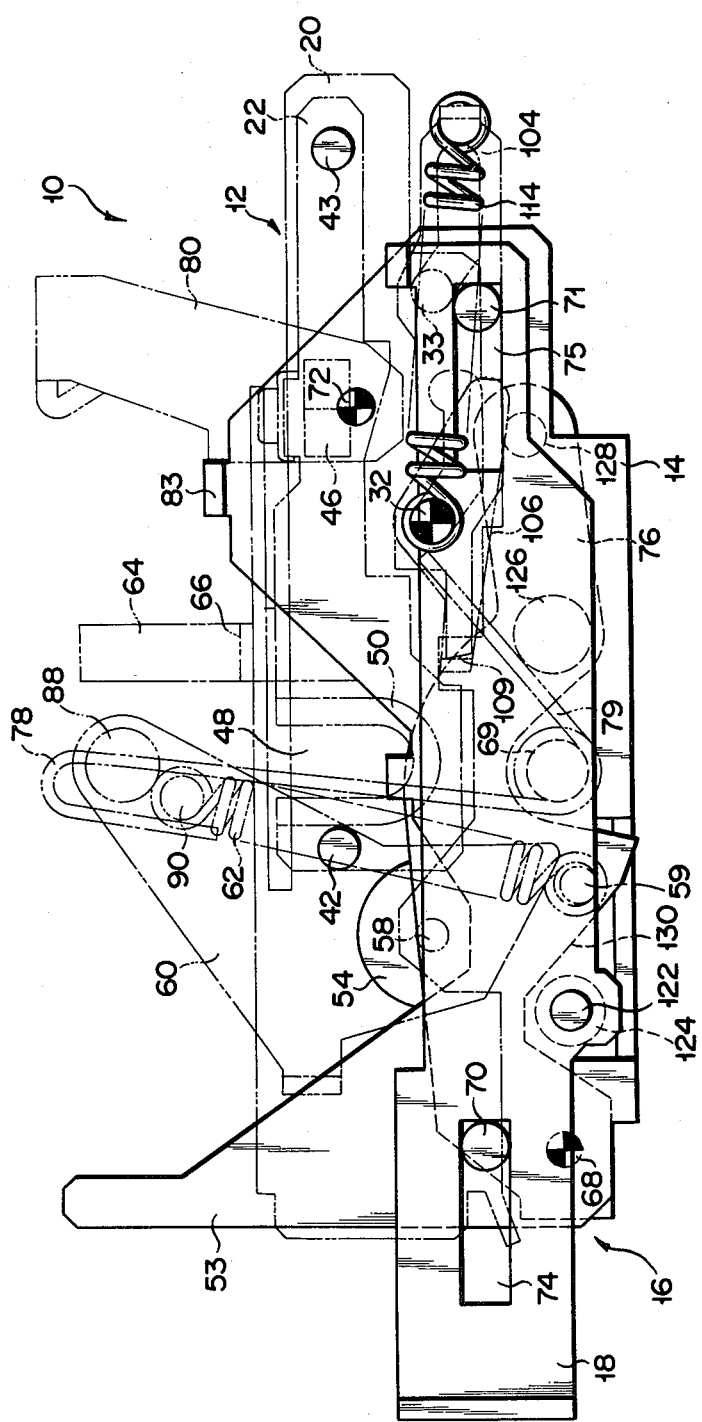

As mentioned before, the cassette ejection is achieved by pressing the ejecting plate 18 in the state of FIG. 11. When the ejecting plate 18 is pressed against the biasing force of the return spring or tension spring 84, it is moved horizontally to the right through the engagement of the pins 70 and 71 with the slots 74 and 75. Then, as the ring 124 of the ejecting plate 18 abuts against and rolls along the cam surface 130 of the kick plate 76, the kick plate 76 rocks in the counterclockwise direction around the pin 68, as shown in FIG. 12. When the ejecting plate 18 is pressed to rock the kick plate 76, the pins 126 and 128 of the kick plate 76 are pressed against the one end portion 79 of the torsion spring 78 and the lower-edge bent portion 132 of the cassette holder 20, respectively. As the kick plate 76 rocks, the cassette holder 20 moves up, pressed by the pin 128. While the cassette holder 20 is ascending, the one end portion 79 of the torsion spring 78 is pressed by the pin 126 to charge the torsion spring 78 with a biasing force. Thus, the ascent of the cassette holder 20 and the charging of the torsion spring 78 are performed at the same time accompanying the rocking of the kick plate 76, so that the cassette ejection is improved in operating efficiency, and wrong operation can be avoided. When the cassette holder 20 is raised fully, the ring 88 of the rocking plate 60 is caught in the guide slot 48 of the slider 22. The upper position of the cassette holder 20 is regulated by the holder supporting plate 80, which sustains the cassette holder 20 in the upper position. Directly before the cassette holder 20 reaches the upper position, the shoulder portion 66 of the release plate 64 engages the upper left edge 107 of the stopper plate 106 to prevent the rise of the stopper plate 106. When the cassette holder 20 is further raised, however, the stopper plate 106 ascends and rocks in the counterclockwise direction around the pin 32. As for the operating plate 104, it moves up together with the cassette holder 20. Accordingly, the rise of the extended portion 108 of the operating plate 104 differs from the rise of the stopper strip 118 of the stopper plate 106 to cause the slanting surface 109 of the extended portion 108 to be disengaged from the stopper strip 118. The left end 133 of the operating plate 104, released from the engagement with the stopper plate 106, presses the shoulder portion 117 of the slider 22 to urge the slider 22 to slide to the left by the agency of the biasing force of the tension spring 114 previously charged at the cassette insertion. The moment the cassette holder 20 reaches the upper position, the slider 22 is slid to the left by the biasing force of the tension spring 114 charged at the cassette insertion and the biasing force of the torsion spring 78 charged by the rocking of the kick plate 76 pressed by the ejecting plate 18, holding the cassette 36. Namely, in this embodiment, either of the tension spring 114 and the torsion spring 78 functions as an ejecting spring. In a stroke corresponding to the drawing-in stroke Ld for the cassette insertion, the biasing force of the toggle spring or tension spring 62 acts on the slider 22 as a resisting force. However, since the biasing force of the tension spring 114 charged at the cassette insertion, as well as the biasing force of the torsion spring 78 produced at the cassette ejection, acts as an ejecting force, so the slider 22 can smoothly slide to the left against the resisting force of the tension spring 62. While the slots 30 and 31 of the cassette holder 20 each have a length equivalent to the total stroke (=Li+Ld), the slots 102 and 103 of the operating plate 104 are each given a length equivalent to the drawing-in stroke Ld for secure control of the time when the biasing force of the tension spring 114 acts on the slider 22. When the slider 22 slides to the left to reach the neutral point of the toggle spring 62, the pins 32 and 33 come into contact with the right ends of the slots 102 and 103, respectively, so that the biasing force of the tension spring 114 cannot act on the slider 22 any more. After the neutral point of the toggle spring is passed, however, the leftward slide of the slider 22 is promoted by the biasing force of the tension spring 62 as the toggle spring newly added to the biasing force of the torsion spring 78, and thus enough ejecting force can be obtained. Hereupon, the biasing forces of the ejecting spring 78 and the toggle spring 62 both act on one and the same member, i.e., the rocking plate 60, and are transmitted to the slider 22 through the rocking plate 60. Thus, the slider 22 can slide smoothly. Then, the cam surface 136 of the slider 22 comes into contact with the cam surface 134 of the operating plate 104 to rock the operating plate 104 in the counterclockwise direction around the pin 33. At this time, the pin 32 is guided by the vertical portion of the slot 32. The stopper plate 106, having its upper left edge 107 engaged with the shoulder portion 66 of the release plate 64, urges the operating plate 104 to move upward, with its pin 116 pressing the tension spring 114 sideways. Accordingly, the operating plate 104 is restored to the position where the left end 133 can engage the shoulder portion 115 of the slider 22 after rocking in the counterclockwise direction (see FIG. 1).

The cassette loading/unloading apparatus for cassette tape recorder according to the above-mentioned embodiment is intended for use with micro cassettes with which large strokes cannot be obtained. With compact cassettes, however, the strokes can be large enough, and the pushing-in and drawing-in strokes are equal in length, as in the case of the prior art apparatus. Namely, in a loading/unloading apparatus for compact cassettes, the pin 59 as the fitting pin for the tension spring 62 is located on the perpendicular bisector 94, as represented by two-dot chain line in FIG. 5. Then, the neutral point of the toggle spring 62 is also located on the perpendicular bisector 94. In such an arrangement, the drawing-in stroke may also be large, so that the ejecting force necessary for the cassette ejection can fully be secured by the ejecting spring (tension spring 114) and the toggle spring (tension spring 62) even if the torsion spring 78 as the ejecting spring is omitted. If the torsion spring 78 is eliminated, then the pin 126 of the kick plate 76 will be omitted.

According to the cassette loading/unloading apparatus for cassette tape recorder of this invention, as described above, an ejecting spring such as the tension spring 114 is previously charged with a biasing force in concert with the slide of the slider which slides together with a cassette inside the cassette holder at cassette insertion, and the charged biasing force of the ejecting spring is caused to act as an ejecting force on the slider at cassette ejection. In such an arrangement, even if the biasing force of the toggle spring to act as a resisting force at the cassette ejection is increased by making the drawing-in stroke large, the ejecting spring can provide an ejecting force to overcome the biasing force of the toggle spring. Accordingly, the ejecting plate can be depressed with a small force to ensure soft-touch cassette ejection. The ejecting spring can be charged with the biasing force only by the slide of the slider in the pushing-in stroke of the cassette insertion. After the slider passes the neutral point of the toggle spring, the ejecting spring is preferably disengaged from the slider to be locked to the charged state. In the drawing-in stroke of the cassette insertion, in such an arrangement, the biasing force of the ejecting spring does not act as the resisting force against the cassette insertion. Thus, the loading/unloading apparatus of the invention can enjoy secure cassette loading.

What is claimed is:

1. A cassette loading/unloading apparatus for a slot-in type cassette tape recorder using a toggle spring, characterized in that the ejecting spring is charged with the biasing force in concert with and only by the slide of a slider, which slides together with a cassette inside a cassette holder at cassette insertion, in a pushing-in stroke of the cassette insertion, and is disengaged from the slider to be locked to a charged state when the slider passes the neutral point of the toggle spring and that the charged biasing force of the ejecting spring is caused to act as an ejecting force on the slider at cassette ejection.

2. A cassette loading/unloading apparatus according to claim 1, wherein an operating plate is slidably mounted on the cassette holder, and said ejecting spring is stretched between the cassette holder and the operating plate to function as a return spring for the operating plate, said operating plate sliding together with the slider against the biasing force of the ejecting spring in the pushing-in stroke of the cassette insertion, thereby keeping the return spring charged with the biasing force in the drawing-in stroke of the cassette insertion, so that the biasing force charged on the return spring acts on the slider only in the cassette ejecting stroke corresponding to the pushing-in stroke.

3. A cassette loading/unloading apparatus according to claim 2, wherein said slider has a first shoulder portion to engage the operating plate in the pushing-in stroke of the cassette insertion, and a second shoulder portion located above the first shoulder portion to be engaged with the operating plate in the cassette ejecting stroke corresponding to the pushing-in stroke, and said operating plate has a pair of slots to be guided by a pair of guide pins attached to the cassette holder, each said slot including a horizontal portion to allow horizontal slide of the operating plate and a slanting portion to allow the operating plate to descend and be disengaged from the second shoulder portion, and having a length equivalent to the drawing-in stroke of the cassette insertion.

4. A cassette loading/unloading apparatus according to claim 3, wherein a stopper plate is rockably attached to the cassette holder, said stopper plate rocking to stop the operating plate when the slider proceeds from the pushing-in stroke to the drawing-in stroke at the cassette insertion.

5. A cassette loading/unloading apparatus according to claim 4, wherein said stopper has a pin to engage the return spring for the operating plate and to urge the stopper plate to rock and a stopper strip capable of engaging the operating plate, a release plate formed of a leaf spring is attached to the baseplate, said release plate having a shoulder portion to be engaged with the stopper plate to maintain the stopper plate in the position before rocking, and a cam strip is attached to slider, whereby the release plate is deformed so that the stopper plate is disengaged from the shoulder portion of the release plate to allow the stopper plate to rock as the slider proceeds from the pushing-in stroke to the drawing-in stroke at the cassette insertion.

* * * * *

UNITED STATES PATENT AND TRADEMARK OFFICE
CERTIFICATE OF CORRECTION

PATENT NO.   : 4,466,030

DATED        : August 14, 1984

INVENTOR(S)  : Toshikazu KATO

It is certified that error appears in the above-identified patent and that said Letters Patent is hereby corrected as shown below:

Col.1, line 16, after "is" delete "instant" and insert -- instantly --
      line 17, after "called" insert -- the --
      line 18, after "called" insert -- the --
      line 41, after "for" insert -- a --

Col.2, line 37, after "2)" insert -- , -- and delete "and"
      line 38, after "28" insert -- which --; after "which" delete "extendes" and insert -- extends --

Col.4, line 1, after "substantial" insert -- and --

Col.6, line 13, after "the" delete "holer" and insert -- holder --

Claim 1, line 34, delete "A" and insert -- In a --
      line 36, delete "characterized in that the" and insert
      -- coupled to a slider, said toggle spring being arranged to have a neutral point of operation, the improvement wherein:

line 36, before "ejecting" insert -- an --; after "spring is" insert --provided which is --

Claim 2, line 54, before "drawing-in", change "the" to -- a --.

Signed and Sealed this

Thirtieth Day of April 1985

[SEAL]

Attest:

DONALD J. QUIGG

Attesting Officer      Acting Commissioner of Patents and Trademarks